US011875616B2

(12) United States Patent
Yamashita et al.

(10) Patent No.: US 11,875,616 B2
(45) Date of Patent: Jan. 16, 2024

(54) VEHICLE STATE MONITORING DEVICE

(71) Applicant: TOYOTA JIDOSHA KABUSHIKI KAISHA, Aichi-ken (JP)

(72) Inventors: Yoshiya Yamashita, Toyota (JP); Tetsu Yamada, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 278 days.

(21) Appl. No.: 17/199,439

(22) Filed: Mar. 12, 2021

(65) Prior Publication Data

US 2021/0335065 A1 Oct. 28, 2021

(30) Foreign Application Priority Data

Apr. 27, 2020 (JP) ................................. 2020-078040

(51) Int. Cl.
*G07C 5/08* (2006.01)

(52) U.S. Cl.
CPC .................................. *G07C 5/0841* (2013.01)

(58) Field of Classification Search
CPC ... G07C 5/0841; G07C 5/0816; G07C 5/0808
See application file for complete search history.

(56) References Cited

U.S. PATENT DOCUMENTS 5,590,040 A 12/1996 Abe et al.
5,789,882 A * 8/1998 Ibaraki .................. B60W 20/13 290/40 C
10,430,800 B2 10/2019 Remboski et al.
2004/0148084 A1* 7/2004 Minami .............. F16H 61/0213 701/55
2011/0238255 A1* 9/2011 Sano ................... B60R 16/0236 701/31.4

(Continued)

FOREIGN PATENT DOCUMENTS

JP S60-93131 A 5/1985
JP S63-295915 A 12/1988

(Continued)

OTHER PUBLICATIONS

English Translation of CN207924496U Author: Wu et al. Title: A Fault Detection Device of a Portable Vehicular Data Collector Date: Sep. 28, 2018 (Year: 2018).*

(Continued)

*Primary Examiner* — James J Lee
*Assistant Examiner* — Steven Vu Nguyen
(74) *Attorney, Agent, or Firm* — HAUPTMAN HAM, LLP

(57) ABSTRACT

A vehicle state monitoring device includes a storage device configured to store information relating to a vehicle traveling under power from an engine; a determining device configured to determine a state of the vehicle using the information stored in the storage device; and a storage control device. The storage control device is configured to, each time the vehicle travels a predetermined distance, store a frequency relation as the information in the storage device. The frequency relation is a relation between revolutions of the engine, a fuel-related parameter that is a load factor or a fuel injection rate of the engine, and a running frequency of the engine at the revolutions and the fuel-related parameter while the vehicle travels the predetermined distance.

12 Claims, 4 Drawing Sheets

(56) References Cited

U.S. PATENT DOCUMENTS

| | | | | |
|---|---|---|---|---|
| 2017/0136876 | A1* | 5/2017 | Boss | H04N 23/00 |
| 2017/0221069 | A1 | 8/2017 | Remboski et al. | |
| 2018/0258802 | A1* | 9/2018 | Hashimoto | F01L 13/0005 |
| 2019/0162096 | A1* | 5/2019 | Hoehne | F01N 3/2066 |
| 2021/0201598 | A1* | 7/2021 | Im | G07C 5/008 |

FOREIGN PATENT DOCUMENTS

| | | | |
|---|---|---|---|
| JP | H6-66198 | A | 3/1994 |
| JP | 2005326380 | A | 11/2005 |
| JP | 2019190296 | A | 10/2019 |

OTHER PUBLICATIONS

English Translation of JPH08218851A Author: Matsumoto et al. Title: Deterioration Diagnosing Device For Exhaust Gas Purifying Catalyst Date: Aug. 27, 1996 (Year: 1996).*

* cited by examiner

VEHICLE STATE MONITORING DEVICE

CROSS-REFERENCE TO RELATED APPLICATION

This application claims priority to Japanese Patent Application No. 2020-078040 filed on Apr. 27, 2020, incorporated herein by reference in its entirety.

BACKGROUND

1. Technical Field

The disclosure relates to a vehicle state monitoring device, and more particularly relates to a vehicle state monitoring device provided with a determining device that determines a state of a vehicle traveling under power from an engine.

2. Description of Related Art

Conventionally, there are proposed such vehicle state monitoring devices that are provided with a storage device (sensing unit) and a determining device (analyzing system) (e.g., see Japanese Unexamined Patent Application Publication No. 2005-326380 (JP 2005-326380 A)). The storage device stores information relating to the state of the vehicle traveling under power from the engine. The determining device uses the information stored in the storage device to determine (analyze) the state of the vehicle. This vehicle state monitoring device collects information (data) acquired at various types of sensors at each of predetermined time intervals, and updates the information already stored in the storage device with the newly-collected information.

SUMMARY

However, the above-described vehicle state monitoring device updates information stored in the storage device at each of predetermined time intervals, and accordingly information cannot be stored in the storage device longer than the predetermined time. A conceivable technique to hold information over a long period is to hold the information stored in the storage device without updating. However, the storage capacity of the storage device is limited, and the storage capacity of the storage device may become insufficient with this technique.

The vehicle state monitoring device according to the disclosure enables the amount of information held in the storage device to be smaller.

A vehicle state monitoring device according to an aspect of the disclosure includes a storage device configured to store information relating to a vehicle traveling under power from an engine, a determining device configured to determine a state of the vehicle using the information stored in the storage device, and a storage control device. The storage control device is configured to, each time the vehicle travels a predetermined distance, store a frequency relation as the information in the storage device. The frequency relation is a relation between revolutions of the engine, a fuel-related parameter that is a load factor or a fuel injection rate of the engine, and a running frequency of the engine at the revolutions and the fuel-related parameter while the vehicle travels the predetermined distance, as the information in the storage device.

According to this configuration, the amount of information stored in the storage device can be reduced as compared to an arrangement in which engine revolutions and fuel-related parameters are stored in the storage device in time-series without change.

In the above aspect, the storage control device may be configured to, each time the vehicle travels the predetermined distance, store an altitude relation in the storage device. The altitude relation is a relation between the revolutions, the fuel-related parameter, and an average value of altitude of the vehicle at a current location when the engine is running at the revolutions and the fuel-related parameter. The determining device may be configured to determine whether a deposit of a predetermined amount or more is accumulated on a piston of the engine, using the frequency relation and the altitude relation. Thus, determination can be made regarding whether a deposit of a predetermined amount or more is accumulated on the piston of the engine, while reducing the amount of information stored in the storage device.

Also, in the above aspect, the storage control device may be configured to, each time the vehicle travels the predetermined distance, store a vehicle speed relation in the storage device. The vehicle speed relation is a relation between the revolutions, the fuel-related parameter, and an average value of vehicle speed of the vehicle when the engine is running at the revolutions and the fuel-related parameter. The determining device may be configured to determine, when overheating of the engine occurs, a cause of the overheating, using the frequency relation and the vehicle speed relation. Thus, the cause of overheating of the engine can be determined, while reducing the amount of information stored in the storage device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A mode for carrying out the disclosure will be described below using an embodiment.

Figure 1:
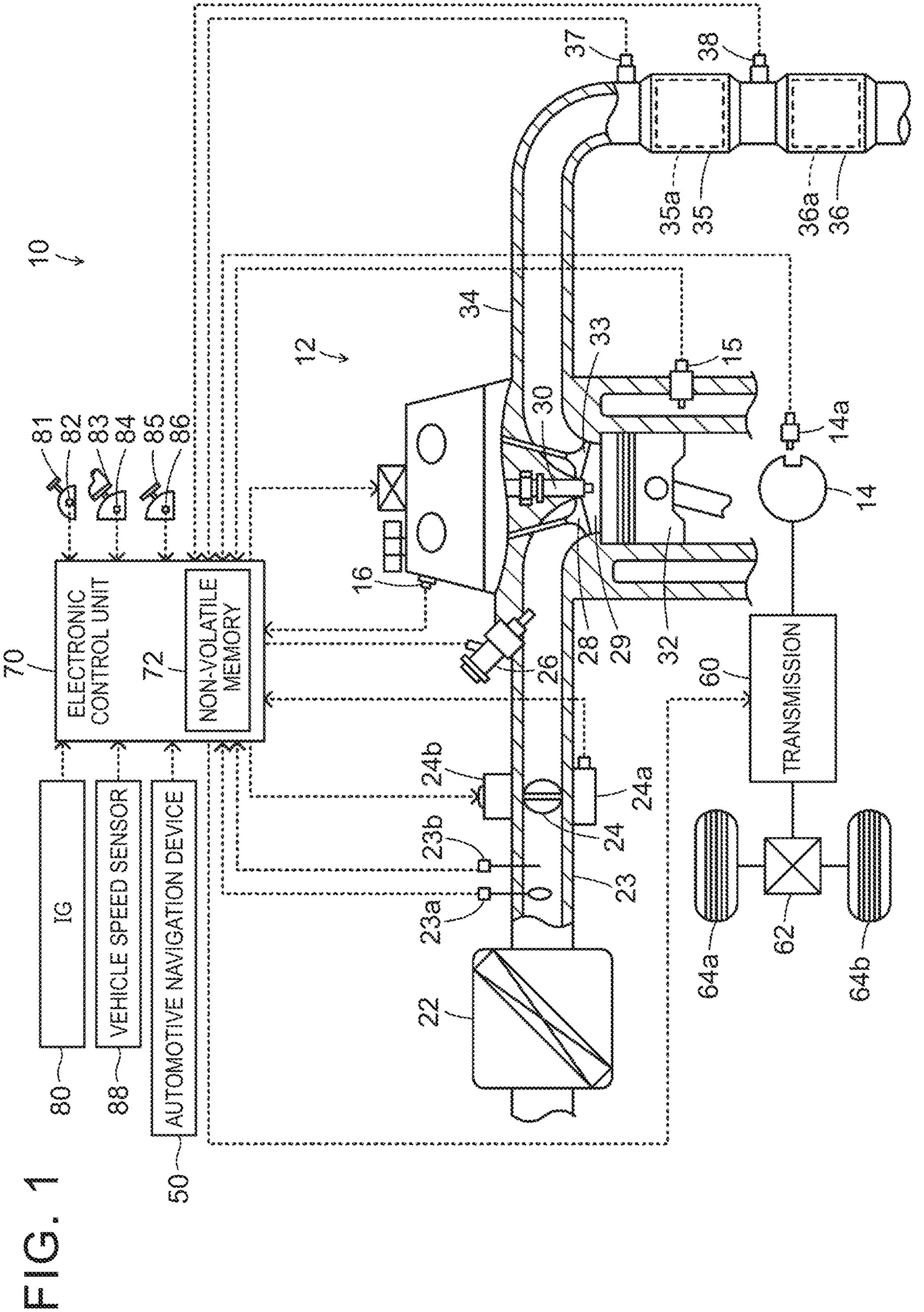
FIG. 1 is a configuration diagram illustrating an overview of a configuration of an automobile 10 in which a vehicle state monitoring device as an embodiment of the disclosure is installed.

FIG. 1 is a configuration diagram illustrating an overview of a configuration of an automobile 10 in which a vehicle state monitoring device as an embodiment of the disclosure is installed. The automobile 10 according to the embodiment is provided with an engine 12, a transmission 60 that is connected to a crankshaft 14 of the engine 12 and is connected to drive wheels 64*a*, 64*b* via a differential gearset 62, an automotive navigation device 50, and an electronic control unit (hereinafter referred to as "ECU") 70 that controls the entire vehicle, as illustrated in FIG. 1. In the embodiment, the ECU 70 is an example of a "vehicle state monitoring device".

The engine 12 is configured as an internal combustion engine that outputs power using fuel such as gasoline and diesel fuel. The engine 12 takes in air cleaned by an air cleaner 22 through an intake pipe 23, passes the air through a throttle valve 24, and injects fuel from a fuel injection valve 26 on the intake pipe 23, downstream from the throttle valve 24, thereby mixing the air and fuel. This air-fuel mixture is then suctioned into a combustion chamber 29 through an intake valve 28, and is subjected to explosive combustion by electric sparks from an ignition plug 30. Reciprocal motion of a piston 32 pushed downward by the energy of the explosive combustion is then converted into rotational motion of the crankshaft 14. Exhaust discharged from the combustion chamber 29 to an exhaust pipe 34 via an exhaust valve 33 is externally discharged via exhaust gas control apparatuses 35, 36, which have a catalyst (three way catalyst) that removes the harmful substances of carbon monoxide (CO), hydrocarbon (HC), and nitrogen oxides (NOx).

Although omitted from illustration, the automotive navigation device 50 is provided with a device main unit, a Global Positioning System (GPS) antenna, a Vehicle Information and Communication System (VICS, a registered trademark) antenna, and a display. Although omitted from illustration, the device main unit has a control processing unit (CPU), read-only memory (ROM), random access memory (RAM), a storage medium, input and output ports, and a communication port. The storage medium of the device main unit stores roadmap information and the like. Service information (e.g., tourism information and parking lots), road information such as various traveling segments (e.g., segments between traffic lights or between intersections), and the like, are stored in the roadmap information as a database. Road information includes distance information, altitude information, road width information, number-of-lanes information, regional information (urban, suburban, or mountainous terrain), type information (ordinary road or freeway), gradient information, legal speed limit, and number of traffic lights. The GPS antenna receives information relating to the current position of the automobile (longitude EP, latitude NP). The VICS (registered trademark) antenna receives traffic congestion information, restriction information, disaster information, and so forth, from an information center. When a destination is set by user operations on the display, the automotive navigation device 50 sets a planned travel route from the current position of the automobile to the destination based on roadmap information stored in the storage medium of the device main unit, the current position of the automobile from the GPS antenna, and the set destination, and displays the planned travel route that is set to perform route navigation on the display. The automotive navigation device 50 is connected to the ECU 70 via a communication port.

The ECU 70 is configured as a microprocessor centered on a CPU, and includes, in addition to the CPU, ROM that stores processing programs, RAM that temporarily stores data, non-volatile memory 72 that stores data in a non-volatile manner, and input and output ports. Signals from various types of sensors are input to the ECU 70 via the input port.

Examples of signals input to the ECU 70 include a crank angle θcr, from a crank position sensor 14*a* that detects the rotational position of the crankshaft 14 of the engine 12, and a coolant temperature Tw from a coolant temperature sensor 15 that detects the temperature of coolant of the engine 12. Other examples include a throttle valve opening degree TH from a throttle position sensor 24*a* that detects the position of the throttle valve 24, and cam angles θci and θco from a cam position sensor 16 that detects the rotational position of an intake camshaft that opens and closes the intake valve 28 and an exhaust camshaft that opens and closes the exhaust valve 33. Further examples include an intake airflow Qa from an airflow meter 23*a* attached to the intake pipe 23, an intake temperature Ta from a temperature sensor 23*b* attached to the intake pipe 23, an air-fuel ratio AF from an air-fuel ratio sensor 37 attached on the upstream side of the exhaust pipe 34 from the exhaust gas control apparatus 35, and an oxygen signal O2 from an oxygen sensor 38 attached to the exhaust pipe 34 between the exhaust gas control apparatus 35 and the exhaust gas control apparatus 36. Also included is roadmap information, road information, and information relating to the current position of the automobile (longitude EP, latitude NP) from the automotive navigation device 50. Still further examples include an ignition signal IG from an ignition switch 80, and a shift position SP from a shift position sensor 82 that detects operation positions of a shift lever 81. Yet further examples include an accelerator pedal operation degree Acc from an accelerator pedal position sensor 84 that detects the amount of depression of an accelerator pedal 83, a brake pedal position BP from a brake pedal position sensor 86 that detects the amount of depression of a brake pedal 85, and a vehicle speed V from a vehicle speed sensor 88.

Various types of control signals are output from the ECU 70 via the output port. Examples of signals output from the ECU 70 are control signals for a throttle motor 24*b* that adjusts the position of the throttle valve 24, control signals for the fuel injection valve 26, and control signals for the ignition plug 30. Control signals for the transmission 60 are also an example.

The ECU 70 computes revolutions Ne of the engine 12 based on the crank angle θcr from the crank position sensor 14*a*. The ECU 70 also computes a load factor (ratio of volume of actual air intake per cycle as to the stroke volume per cycle of the engine 12) KL, based on the intake airflow Qa from the airflow meter 23*a* and the revolutions Ne of the engine 12.

In the automobile 10 according to the embodiment configured as described above, the ECU 70 sets a target gearshift position Gs* for the transmission 60 based on the accelerator pedal operation degree Acc and the vehicle speed V, and controls the transmission 60 such that the gearshift position Gs of the transmission 60 is the target gearshift position Gs*. The ECU 70 also sets a target torque Te* of the engine 12 based on the accelerator pedal operation degree Acc, the vehicle speed V, and the gearshift position Gs of the transmission 60, and performs intake airflow control in which the opening degree of the throttle valve 24 is controlled, fuel injection control in which the fuel injection amount from the fuel injection valve 26 is controlled, ignition control in which ignition timing of the ignition plug 30 is controlled, and so forth, based on the set target torque Te*. The fuel injection control will be described below.

In fuel injection control, various types of correction amounts are applied to a base injection amount Qfb to set a target injection amount Qf*, and the fuel injection valve 26 is controlled using the set target injection amount Qf*. Now, the base injection amount Qfb is a base value for the target injection amount Qf* of the fuel injection valve 26, to make the air-fuel ratio of the air-fuel mixture inside the combustion chamber 29 to be a target air-fuel ratio AF* (e.g., stoichiometric air-fuel ratio), and is set based on the load factor KL of the engine 12.

Figure 2:
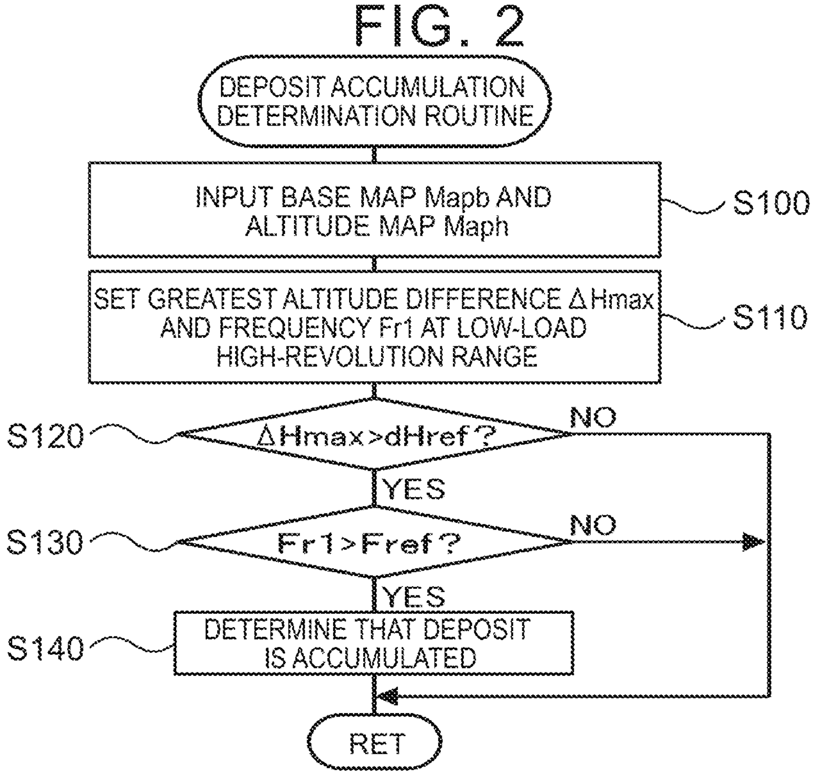
FIG. 2 is a flowchart illustrating an example of a deposit accumulation determination routine executed by an ECU 70.

Next, description will be made regarding operations of the automobile 10 according to the embodiment configured as described above, and in particular operations at the time of determining whether deposit is accumulated on the piston 32 of the engine 12. FIG. 2 is a flowchart illustrating an example of a deposit accumulation determination routine executed by the ECU 70. This routine is executed each time a predetermined distance Dref is traveled. This predetermined distance Dref is set in advance as an interval for making a later-described base map Mapb and altitude map Maph, and is a distance generally recognized as being an average value of the distance that a vehicle travels in one month, such as 8,000 km, 10,000 km, or 12,000 km, for example. Note that the predetermined distance Dref does not have to be the average value of the distance that a vehicle travels in one month, and may be set as appropriate.

When the deposit accumulation determination routine is executed, an unshown CPU of the ECU 70 executes processing of inputting the base map Mapb and the altitude map Maph (step S100). The base map Mapb and the altitude map Maph are maps created by a map creation routine illustrated in FIG. 3, and stored in the non-volatile memory 72. The method of creating the base map Mapb and the altitude map Maph will be described here.

Figure 3:
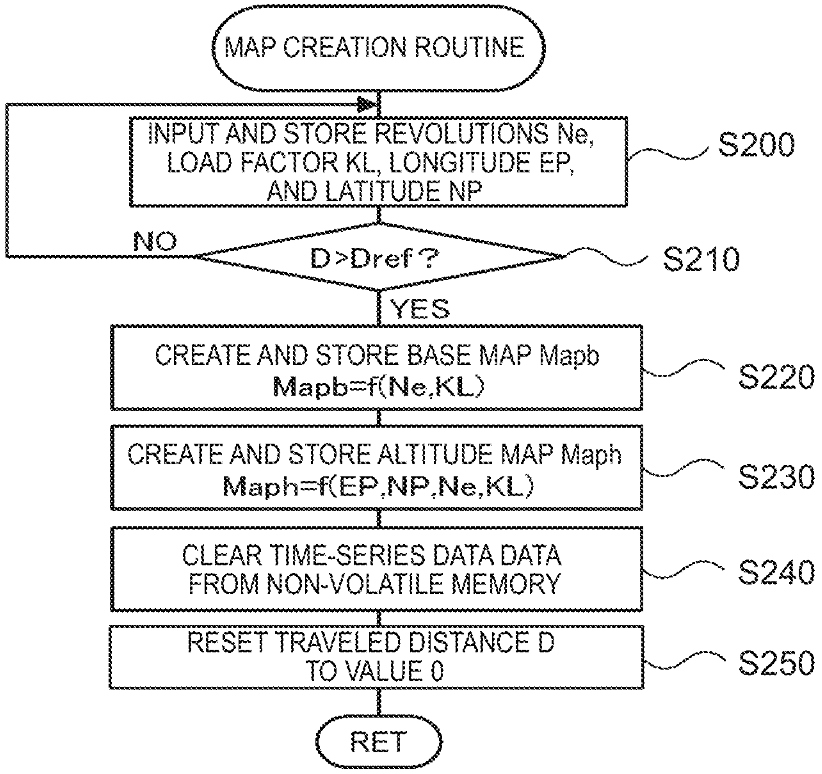
FIG. 3 is a flowchart illustrating an example of a map creation routine executed by the ECU 70.

FIG. 3 is a flowchart illustrating an example of the map creation routine executed by the ECU 70. The map creation routine is repetitively executed.

Figure 4:
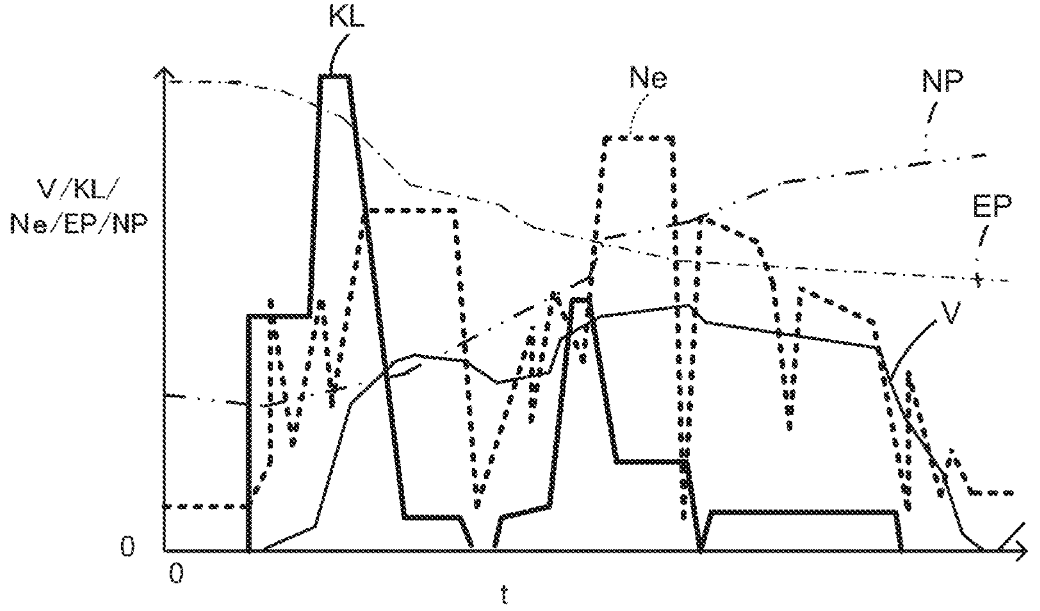
FIG. 4 is an explanatory diagram illustrating an example of time-series data DATA stored in non-volatile memory 72.

When the map creation routine is executed, the CPU of the ECU 70 inputs and stores in the non-volatile memory 72 the revolutions Ne and the load factor KL of the engine 12, and the longitude EP and the latitude NP (step S200). The ECU 70 then determines whether the traveled distance D from starting execution of the map creation routine has exceeded the predetermined distance Dref (step S210). When the traveled distance D is no greater than the predetermined distance Dref, the flow returns to step S200, and thereafter steps S200 and S210 are repeated until the traveled distance D exceeds the predetermined distance Dref. Accordingly, the ECU 70 stores the data input until the traveled distance D exceeds the predetermined distance Dref in the non-volatile memory 72 as time-series data DATA. FIG. 4 is an explanatory diagram illustrating an example of the time-series data DATA stored in the non-volatile memory 72. The data input in step S200 changes while the vehicle travels, in increments of seconds, as illustrated in FIG. 4.

Figure 5:
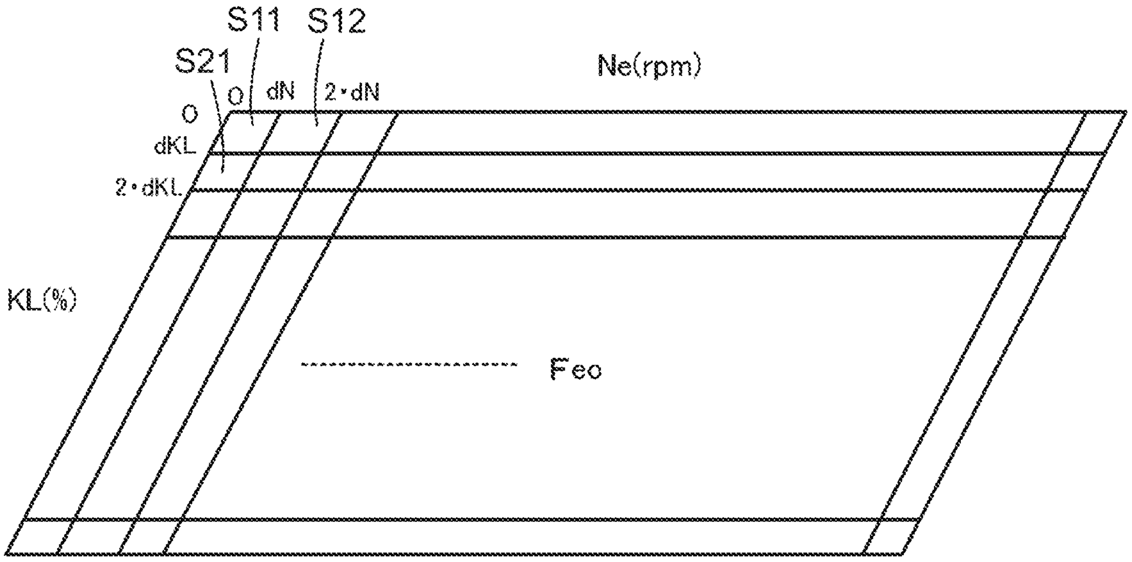
FIG. 5 is an explanatory diagram illustrating an example of a base map Mapb.

When the traveled distance D exceeds the predetermined distance Dref in step S210, the base map Mapb is created using the revolutions Ne and the load factor KL in the time-series data DATA stored in the non-volatile memory 72, and is stored in the non-volatile memory 72 (step S220). The base map Mapb is a map illustrating the relation between the revolutions Ne of the engine 12, the load factor KL, and a running frequency Feo of the engine 12 at the revolutions Ne and the load factor KL during a period of the automobile 10 traveling the predetermined distance Dref. Creating of the base map Mapb is performed by sectioning the revolutions Ne and the load factor KL that the engine 12 can assume while the engine 12 is running, for each of predetermined revolutions dN (e.g., every 200 rpm, 400 rpm, or 600 rpm) and each of predetermined percentages dKL (e.g., 4%, 5%, or 6%), into a plurality of running ranges S11 through Snm ("n" and "m" are natural numbers of 1 or greater), thereby deriving the running frequency (number of times of running) Feo of the engine 12 at the revolutions Ne and the load factor KL included in the running ranges S11 through Snm from the time-series data DATA, and storing the running frequency Feo for each of the running ranges S11 through Snm in the non-volatile memory 72. FIG. 5 is an explanatory diagram illustrating an example of the base map Mapb.

Figure 6:
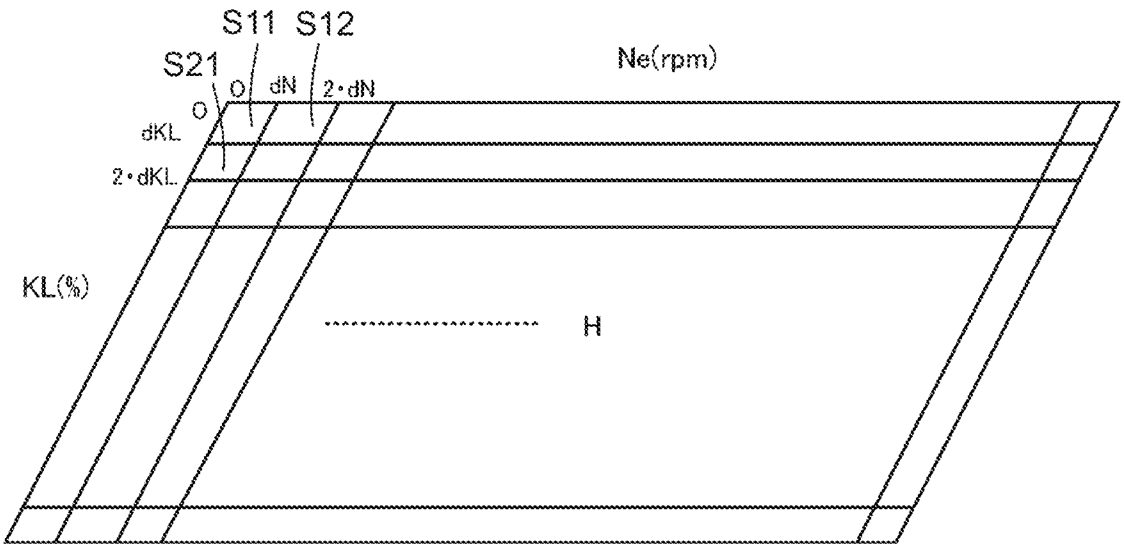
FIG. 6 is an explanatory diagram illustrating an example of an altitude map Maph.

Next, an altitude map Maph is created using the revolutions Ne and the load factor KL, and the latitude NP and the longitude EP, in the time-series data DATA stored in the non-volatile memory 72, and the altitude map Maph is stored in the non-volatile memory 72 (step S230). The altitude map Maph is a map illustrating the relation between the revolutions Ne of the engine 12, the load factor KL, and an average value H of the altitude of points where the vehicle have traveled. Creating of the altitude map Maph is performed by deriving the latitude NP and the longitude EP at each of the above-described running ranges S11 through Snm from the time-series data DATA, deriving an average value H of altitudes at each of the running ranges S11 through Snm from the derived latitude NP and longitude EP and road information (altitude information) from the automotive navigation device 50, and storing the average value H at each running range S11 through Snm in the non-volatile memory 72. FIG. 6 is an explanatory diagram illustrating an example of the altitude map Maph.

Once the base map Mapb and the altitude map Maph are created as described above, the time-series data DATA is cleared from the non-volatile memory 72 (step S240), the traveled distance D is reset to a value 0 (step S250), and the map creation routine ends. Due to such processing, the base map Mapb and the altitude map Maph are created each time the automobile 10 travels the predetermined distance Dref. When a new base map Mapb and altitude map Maph are created, the base map Mapb and the altitude map Maph created previously are not cleared from the non-volatile memory 72, and remain stored without change. Accordingly, this means that a plurality of base maps Mapb and a plurality of altitude maps Maph for each predetermined distance Dref of the traveled distance D are stored in the non-volatile memory 72. For example, when the predetermined distance Dref is 10,000 km, a base map Mapb and an altitude map Maph for a period in which the traveled distance D is greater than 0 km but equal to or less than 10,000 km, a base map Mapb and an altitude map Maph for a period in which the traveled distance D is greater than 10,000 km but equal to or less than 20,000 km, a base map Mapb and an altitude map Maph for a period in which the traveled distance D is greater than 20,000 km but equal to or less than 30,000 km, and so forth, are stored in the non-volatile memory 72.

The data amount of the base maps Mapb and altitude maps Maph is small as compared to that of the time-series data DATA. For example, assuming that each data piece is 2 bytes, and each type of data (revolutions Ne, load factor KL, latitude NP, and longitude EP) is stored in the non-volatile memory 72 as the time-series data DATA every 0.01 seconds, the amount of data for one second is approximately 0.8 KB (i.e., 2 bytes×4 types×100 (times)). Assuming the average vehicle speed of the automobile 10 to be 50 km/h, the amount of time necessary to travel 10,000 km is 200 hours (i.e., 10,000 km divided by 50 km/h), which is 720,000 seconds. Accordingly, the amount of data of the time-series data DATA at the point at which the total traveling distance has reached 200,000 km is approximately 11.5 GB (i.e., 0.8 KB×720,000 seconds×20). In comparison with this, assuming that the predetermined distance Dref is 10,000 km and the total range of running ranges of the engine 12 is 20×20 divisions (in the running ranges S11 through Snm, the value of "n" is 20 and the value of "m" is 20), data capacity of 3.2 KB (i.e., 8×20×20) is necessary for each base map Mapb in the embodiment, since the data capacity necessary for each running range is 8 bytes. Accordingly, the data amount of the base maps Mapb at traveled distance of 200,000 km is 640 KB (i.e., 3.2 KB×20). The data amount of the altitude map Maph at traveled distance of 200,000 km is the same as that of the base map Mapb, which is 640 KB, and accordingly the total data amount of the base maps Mapb and the altitude maps Maph at traveled distance of 200,000 km is smaller in comparison with the time-series data DATA. Thus, the time-series data DATA is sequentially cleared from the non-volatile memory 72 while storing the base maps Mapb and the altitude maps Maph in the non-volatile memory 72, and accordingly the data amount (information amount) to be stored in the non-volatile memory 72 can be reduced.

In step S100 of the deposit accumulation determination routine in FIG. 2, the base map Mapb and the altitude map Maph created as described above are input. The altitude map Maph is then used to set a greatest altitude difference ΔHmax at a low-load high-revolution range out of the running ranges of the engine 12. Also, the base map Mapb is used to set a running frequency Fr1 at the low-load high-revolution range (step S110). The low-load high-revolution range is a range in which the load factor KL of the engine 12 is smaller than a relatively low predetermined load factor KLref (e.g., 8%, 10%, or 12%), and is a range in which the revolutions Ne of the engine 12 are predetermined revolutions Nref (e.g., 2,800 rpm, 3,000 rpm, or 3,200 rpm) or higher. The greatest altitude difference ΔHmax is a value in which the smallest value in the average value H of altitude is subtracted from the largest value, within each running range in the low-load high-revolution range in the altitude map Maph. The running frequency Fr1 is computed as an average value of the running frequency Feo within each running range in the low-load high-revolution range in the base map Mapb.

Next, determination is made regarding whether the greatest altitude difference ΔHmax that is set exceeds a threshold value dHref (step S120) and whether the running frequency Fr1 exceeds a threshold value Fref (step S130). The reason why the greatest altitude difference ΔHmax and the running frequency Fr1 are checked will be described here. It is known that deposits readily grow on the piston 32 of the engine 12 in a state when great change in altitude is repeated at a high frequency with the running range of the engine 12 in the low-load high-revolution range (e.g., a state of descending a hill). Accordingly, whether a deposit is accumulated on the piston 32 of the engine 12 can be determined by checking the greatest altitude difference ΔHmax and the running frequency Fr1 when the running range of the engine 12 is in the low-load high-revolution range. This is the reason why the greatest altitude difference ΔHmax and the running frequency Fr1 are checked in step S120 and S130. Accordingly, steps S120 and S130 are processing for determining whether the traveling state of the automobile 10 is such that there is a deposit accumulated on the piston 32 of the engine 12 that exceeds a predetermined amount. Here, the "threshold value dHref" is a threshold value for determining whether there is a great altitude difference, and is set to, for example, 100 m, 200 m, or 300 m. The "threshold value Fref" is a threshold value for determining whether the running frequency is high, and is set to, for example, ten times per month, twenty times per month, or thirty times per month. The "predetermined amount" here is a deposit amount at which the performance of the engine 12 begins to deteriorate.

When the greatest altitude difference ΔHmax is no greater than the threshold value dHref in step S120, or when the greatest altitude difference ΔHmax exceeds the threshold value dHref in step S120 but the running frequency Fr1 is no greater than the threshold value Fref in step S130, judgment is made that the traveling state of the automobile 10 is not a state where a deposit readily accumulates on the piston 32 of the engine 12, accordingly there is not much of a deposit accumulated, and this routine ends.

When the greatest altitude difference ΔHmax exceeds the threshold value dHref and the running frequency Fr1 exceeds the threshold value Fref in steps S120 and S130, determination is made that the traveling state of the automobile 10 is a state where a deposit readily grows on the piston 32 of the engine 12. Determination is made that a predetermined amount or more of a deposit is accumulated (step S140), and the routine ends. When determining that a deposit is accumulated as described above, various types of control to remove the deposit (e.g., spraying oil from an oil jet that is omitted from illustration onto the piston 32), may be executed, or a warning lamp that is omitted from illustration, situated within the vehicle cabin, may be lit to prompt the user to perform inspection.

According to the automobile 10 in which is installed the vehicle state monitoring device according to the example described above, the base map Mapb that is the relation between the revolutions Ne of the engine 12, the load factor KL of the engine 12, and the running frequency Feo of the engine 12 at the revolutions Ne and the load factor KL while driving the predetermined distance Dref, is stored in the non-volatile memory 72 as information each time the predetermined distance Dref is traveled. Accordingly, the data amount (information amount) stored in the non-volatile memory 72 can be reduced.

Also, the altitude map Maph that is the relation between the revolutions Ne, the load factor KL, and the average value H of altitude of the current location of the automobile 10 when the engine 12 is running at the revolutions Ne and the load factor KL is stored in the non-volatile memory 72, each time the automobile 10 travels the predetermined distance Dref. The base map Mapb and the altitude map Maph are used to determine whether a predetermined amount or more of deposit is accumulated on the piston 32 of the engine 12, and accordingly, whether a deposit is accumulated on the piston 32 of the engine 12 can be determined while reducing the data amount (information amount) stored in the non-volatile memory 72.

In the automobile 10 in which the vehicle state monitoring device according to the embodiment is installed, the base map Mapb and the altitude map Maph are created using the load factor KL. However, a fuel injection rate (amount of fuel injected per unit time) may be used instead of the load factor KL.

In the automobile 10 in which the vehicle state monitoring device according to the embodiment is installed, the altitude map Maph is created in step S230 exemplified in FIG. 3. However, a vehicle speed map Mapv may be created in addition to the altitude map Maph or instead of the altitude map Maph. The vehicle speed map Mapv is a map illustrating the relation between the revolutions Ne of the engine 12, the load factor KL, and the vehicle speed V when the engine 12 is running at the revolutions Ne and the load factor KL. The vehicle speed map Mapv is created by obtaining an average value Vav of the vehicle speed V at each running range of the running ranges S11 through Snm from the time-series data DATA, and storing the average value Vav for each of the running ranges S11 through Snm.

Figure 7:
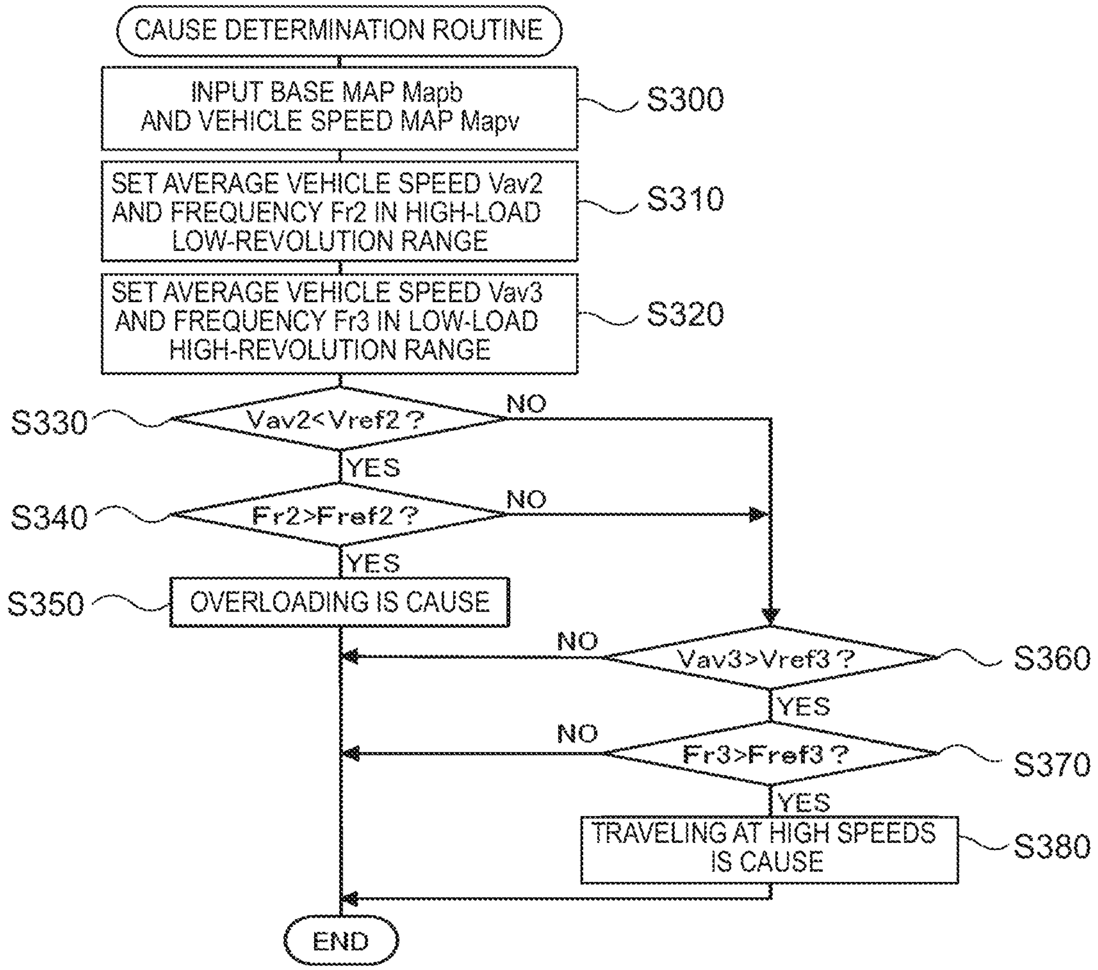
FIG. 7 is a flowchart illustrating an example of a cause determination routine executed by the ECU 70.

Using the base map Mapb and the vehicle speed map Mapv enables the cause to be found when the engine 12 overheats. In this case, a cause determination routine in FIG. 7 is executed instead of the deposit accumulation determination routine in FIG. 2. FIG. 7 is a flowchart illustrating an example of the cause determination routine that the ECU 70 executes. This routine is executed when the engine 12 overheats.

When the cause determination routine is executed, the ECU 70 inputs the base map Mapb and the vehicle speed map Mapv (step S300), uses the vehicle speed map Mapv to set an average vehicle speed Vav2 at a high-load low-revolution range of the running ranges of the engine 12, and also uses the base map Mapb to set a running frequency Fr2 at the high-load low-revolution range (step S310). The high-load low-revolution range is a range where the load factor KL of the engine 12 is equal to or more than a relatively high predetermined load factor KLref2 (e.g., 60%, 70%, or 80%), and the revolutions Ne of the engine 12 are below predetermined revolutions Nref2 (e.g., 2500 rpm, 2600 rpm, or 2700 rpm). The average vehicle speed Vav2 is an average value of the vehicle speed V (average value Vav) at each running range within the high-load low-revolution range in the vehicle speed map Mapv. The running frequency Fr2 is computed as an average value of the running frequency Feo at each running range within the high-load low-revolution range in the base map Mapb.

Next, the vehicle speed map Mapv is used to set an average vehicle speed Vav3 at the low-load high-revolution range of the running ranges of the engine 12, and the base map Mapb is used to set a running frequency Fr3 at the low-load high-revolution range (step S320). The low-load high-revolution range is a range where the load factor KL of the engine 12 is below a relatively low predetermined load factor KLref3 (e.g., 8%, 10%, or 12%), and the revolutions Ne of the engine 12 exceed predetermined revolutions Nref3 (e.g., 2800 rpm, 3000 rpm, or 3200 rpm). The average vehicle speed Vav3 is an average value of the average value Vav of the vehicle speed V at each running range within the low-load high-revolution range in the vehicle speed map Mapv. The running frequency Fr3 is an average value of the running frequency Feo at each running range within the low-load high-revolution range in the base map Mapb.

Next, determination is made regarding whether the set average vehicle speed Vav2 is smaller than a threshold value Vref2 (step S330) and whether the running frequency Fr2 exceeds a threshold value Fref2 (step S340). The reason why the average vehicle speed Vav2 and the running frequency Fr2 are checked will be described here. When the automobile 10 is overloaded, a state in which the vehicle speed V is low despite the running range of the engine 12 being in the high-load low-revolution range, is repeated with a high frequency, and the engine 12 may overheat. Accordingly, checking the average vehicle speed Vav2 and the running frequency Fr2 when the running range of the engine 12 is in the high-load low-revolution range enables determination of whether the cause of overheating is overloading of the automobile 10. This is the reason why the average vehicle speed Vav2 and the running frequency Fr2 are checked in steps S330 and S340. Accordingly, steps S330 and S340 are processing to determine whether the cause of overheating is overloading of the automobile 10. The “threshold value Vref2” is a threshold to determine whether the vehicle speed V is low, and is set to, for example, 10 km/h, 30 km/h, or 50 km/h. The “threshold value Fref2” is a threshold value for determining whether the running frequency is high, and is set to, for example, 20 times per month, 40 times per month, or 60 times per month.

When the average vehicle speed Vav2 is below the threshold value Vref2 and the running frequency Fr2 exceeds the threshold value Fref2 in steps S330 and S340, determination is made that the automobile 10 is overloaded, determination is made that the cause of overheating is overloading (step S350), and the routine ends.

When the average vehicle speed Vav2 is equal to or more than the threshold value Vref2 in step S330, or when the average vehicle speed Vav2 is smaller than the threshold value Vref2 in step S330 but the running frequency Fr2 is equal to or less than the threshold value Fref2 in step S340, determination is made that the automobile 10 is not overloaded. Subsequently, determination is made regarding whether the set average vehicle speed Vav3 exceeds a threshold value Vref3 (step S360) and whether the running frequency Fr3 exceeds a threshold value Fref3 (step S370). The reason why the average vehicle speed Vav3 and the running frequency Fr3 are checked will be described here. When the automobile 10 is traveling at high speeds, a state in which the vehicle speed V is high despite the running range of the engine 12 being in the low-load high-revolution range, is repeated with a high frequency, and the engine 12 may overheat. Accordingly, checking the average vehicle speed Vav3 and the running frequency Fr3 when the running range of the engine 12 is in the low-load high-revolution range enables determination of whether the cause of overheating is traveling at high speeds. This is the reason why the average vehicle speed Vav3 and the running frequency Fr3 are checked in steps S360 and S370. Accordingly, steps S360 and S370 are processing to determine whether the cause of overheating is traveling at high speeds. The “threshold value Vref3” here is a threshold to determine whether the vehicle speed V is high, is a value that is a higher value than threshold value Vref2, and is set to, for example, 130 km/h, 150 km/h, or 170 km/h. The “threshold value Fref3” is a threshold value for determining whether the running frequency is high, and is set to, for example, 20 times per month, 40 times per month, or 60 times per month.

When the average vehicle speed Vav3 exceeds the threshold value Vref3 and the running frequency Fr3 exceeds the threshold value Fref3 in steps S360 and S370, determination is made that the automobile 10 is traveling at high speeds at a high frequency, determination is made that the cause of overheating is traveling at high speeds (step S380), and the cause determination routine ends.

When the average vehicle speed Vav3 is equal to or less than the threshold value Vref3 in step S360, or when the average vehicle speed Vav3 exceeds the threshold value Vref3 in step S360 but the running frequency Fr3 is equal to or less than the threshold value Fref3 in step S370, determination is made that the cause of overheating is neither overloading nor traveling at high speeds, and the cause determination routine ends. According to such processing, whether the cause of overheating of the engine 12 is overloading, or whether the cause is traveling at high speeds, can be identified.

In the automobile 10 in which the vehicle state monitoring device according to the embodiment is installed, the ECU 70 installed in the automobile 10 executes the deposition accumulation determination routine in FIG. 2 and the map creation routine in FIG. 3. However a configuration may be made where the ECU 70 can communicate data with a cloud server outside of the vehicle, and part or all of the processing of the deposition accumulation determination routine in FIG. 2 and the map creation routine in FIG. 3 may be performed at the cloud server. For example, the map creation routine in FIG. 3 may be executed by the automobile 10 and the deposition accumulation determination routine in FIG. 2 may be executed by the cloud server. In this case, the base maps Mapb and the altitude maps Maph are transmitted from the automobile 10 to the cloud server. The data amount of the base maps Mapb and the altitude maps Maph is reduced, and accordingly the amount of communication between the automobile 10 and the cloud server is reduced here. Accordingly, communication costs between the automobile 10 and the cloud server can be reduced.

In the automobile 10 in which the vehicle state monitoring device according to the embodiment is installed, the base map Mapb and the altitude map Maph are created by the deposition accumulation determination routine in FIG. 2 and the map creation routine in FIG. 3, and the base map Mapb and the altitude map Maph are used to determine the state of the automobile 10. However, an arrangement may be made where only the base map Mapb is created, and the state of the automobile 10 is determined using the base map Mapb.

In the automobile 10 in which the vehicle state monitoring device according to the embodiment is installed, the base map Mapb and the altitude map Maph are stored in the non-volatile memory 72. However, any device may be used as a storage device to store the base map Mapb and the altitude map Maph, as long as a device that is able to hold data even after the system of the automobile 10 is shut down.

An arrangement in which the vehicle state monitoring device according to the disclosure is applied to an automobile that does not have an electric motor and travels under power from the engine 12 is exemplified in the embodiment, but the vehicle state monitoring device may be applied to a hybrid vehicle that is able to travel under power from the engine 12 and power from an electric motor. The vehicle state monitoring device may also be applied to vehicles other than automobiles, such as trains and construction machinery.

In the embodiment, the non-volatile memory 72 is an example of a "storage device", the ECU 70 is an example of a "determining device", and the ECU 70 is an example of a "storage control device".

Note that the example is merely a specific example of the disclosure.

Although the mode to carry out the disclosure has been described using the embodiment, the disclosure is not limited whatsoever by such an embodiment, and various modes may be made without departing from the essence of the disclosure, as a matter of course.

The disclosure is applicable to manufacturing industries of vehicle state monitoring devices.

What is claimed is:

1. A vehicle state monitoring device, comprising:
- a memory configured to store information relating to a vehicle traveling under power from an engine; and
- a processor configured to
  - store, in the memory, a first time series of values representing revolutions of the engine and a second time series of values representing a fuel-related parameter that is a load factor or a fuel injection rate of the engine while the vehicle travels a predetermined distance;
  - store a frequency relation as the information in the memory each time the vehicle travels the predetermined distance, the frequency relation being a relation between the revolutions of the engine, the fuel-related parameter, and a running frequency of the engine at the revolutions of the engine and the fuel-related parameter while the vehicle travels the predetermined distance;
  - store an altitude relation in the memory each time the vehicle travels the predetermined distance, the altitude relation being a relation between the revolutions of the engine, the fuel-related parameter, and an average value of altitude of the vehicle at a current location when the engine is running at the revolutions of the engine and the fuel-related parameter;
  - clear the first time series of values and the second time series of values from the memory in response to storing the frequency relation;
  - determine a state of the vehicle using the information stored in the memory; and determine whether a deposit of a predetermined amount or more is accumulated on a piston of the engine, using
    - a portion of the frequency relation including running frequencies of the engine at revolutions of the engine equal to or greater than a predetermined revolutions value and fuel-related parameters equal to or less than a predetermined parameter value, and
    - a portion of the altitude relation including average values of altitude of the vehicle when the engine is running at revolutions of the engine equal to or greater than the predetermined revolutions value and fuel-related parameters equal to or less than the predetermined parameter value.

2. he vehicle state monitoring device according to claim 1, wherein the processor is further configured to
- store a vehicle speed relation in the memory each time the vehicle travels the predetermined distance, the vehicle speed relation being a relation between the revolutions of the engine, the fuel-related parameter, and an average value of a vehicle speed of the vehicle when the engine is running at the revolutions of the engine and the fuel-related parameter; and determine, when overheating of the engine occurs, a cause of the overheating, using the frequency relation and the vehicle speed relation.

3. he vehicle state monitoring device according to claim 1, wherein the processor is further configured to create the frequency relation; and
- a data amount of the frequency relation is smaller than a total data amount of the revolutions of the engine and the fuel-related parameter.

4. The vehicle state monitoring device according to claim 1, wherein the processor is further configured to determine the state of the vehicle using an average of running frequencies included in the portion of the frequency relation.

5. The vehicle state monitoring device according to claim 1, wherein the processor is further configured to
- determine whether the deposit of the predetermined amount or more is accumulated on the piston of the engine using an average of running frequencies included in the portion of the frequency relation and a greatest difference among average values of altitude included in the portion of the altitude relation.

6. A vehicle state monitoring device comprising:
- a memory configured to store information relating to a vehicle traveling under power from an engine; and
- a processor configured to
  - store, in the memory, a first time series of values representing revolutions of the engine and a second time series of values representing a fuel-related parameter that is a load factor or a fuel injection rate of the engine while the vehicle travels a predetermined distance;

store a frequency relation as the information in the memory each time the vehicle travels the predetermined distance, the frequency relation being a relation between the revolutions of the engine, the fuel-related parameter, and a running frequency of the engine at the revolutions of the engine and the fuel-related parameter while the vehicle travels the predetermined distance;

store a vehicle speed relation in the memory each time the vehicle travels the predetermined distance, the vehicle speed relation being a relation between the revolutions of the engine, the fuel-related parameter, and an average value of a vehicle speed of the vehicle when the engine is running at the revolutions of the engine and the fuel-related parameter;

clear the first time series of values and the second time series of values from the memory in response to storing the frequency relation;

determine a state of the vehicle using a first portion of the frequency relation including running frequencies of the engine at revolutions of the engine equal to or greater than a first predetermined revolutions value and fuel-related parameters equal to or less than a first predetermined parameter value, a second portion of the frequency relation including running frequencies of the engine at revolutions of the engine equal to or less than a second predetermined revolutions value and fuel-related parameters equal to or greater than a second predetermined parameter value, a first portion of the vehicle speed relation including average values of the vehicle speed when the engine is running at revolutions of the engine equal to or greater than the first predetermined revolutions value and fuel-related parameters equal to or less than the first predetermined parameter value, and a second portion of the vehicle speed relation including average values of the vehicle speed when the engine is running at revolutions of the engine equal to or less than the second predetermined revolutions value and fuel-related parameters equal to or greater than the second predetermined parameter value; and determine, when overheating of the engine occurs, a cause of the overheating, using the frequency relation and the vehicle speed relation.

7. The vehicle state monitoring device according to claim 6, wherein the processor is further configured to determine the cause of the overheating using a first average of running frequencies included in the first portion of the frequency relation, a second average of running frequencies included in the second portion of the frequency relation, a first average of average values of the vehicle speed included in the first portion of the vehicle speed relation, and a second average of average values of the vehicle speed included in the second portion of the vehicle speed relation.

8. The vehicle state monitoring device according to claim 7, wherein the processor is further configured to determine whether high-speed traveling is the cause of the overheating using the first average of running frequencies included in the first portion of the frequency relation and the first average of average values of the vehicle speed included in the first portion of the vehicle speed relation.

9. The vehicle state monitoring device according to claim 7, wherein the processor is further configured to determine whether overloading is the cause of the overheating using the second average of running frequencies included in the second portion of the frequency relation and the second average of average values of the vehicle speed included in the second portion of the vehicle speed relation.

10. The vehicle state monitoring device according to claim 6, wherein the processor is further configured to store an altitude relation in the memory each time the vehicle travels the predetermined distance, the altitude relation being a relation between the revolutions of the engine, the fuel-related parameter, and an average value of altitude of the vehicle at a current location when the engine is running at the revolutions of the engine and the fuel-related parameter; and determine whether a deposit of a predetermined amount or more is accumulated on a piston of the engine, using the frequency relation and the altitude relation.

11. The vehicle state monitoring device according to claim 6, wherein the processor is further configured to create the frequency relation; and a data amount of the frequency relation is smaller than a total data amount of the revolutions of the engine and the fuel-related parameter.

12. The vehicle state monitoring device according to claim 6, wherein the processor is further configured to determine the state of the vehicle using an average of running frequencies included in the portion of the frequency relation.

* * * * *